United States Patent
Saneyoshi et al.

[11] Patent Number: 6,148,250
[45] Date of Patent: Nov. 14, 2000

[54] ALTITUDE DETECTION BY USE OF PLANAR APPROXIMATION OF A REGION OF GROUND SURFACE

[75] Inventors: Keiji Saneyoshi; Hideaki Tsuchiya, both of Tokyo, Japan

[73] Assignee: Fuji Jukogyo Kabushiki Kaisha, Tokyo, Japan

[21] Appl. No.: 09/246,456

[22] Filed: Feb. 9, 1999

[30] Foreign Application Priority Data

Feb. 18, 1998 [JP] Japan .................................. 10-036232

[51] Int. Cl.$^7$ ...................................................... G05D 1/00
[52] U.S. Cl. .............................................. 701/4; 348/117
[58] Field of Search ............................... 701/3, 4, 11, 28, 701/225; 244/17.13, 162, 164; 382/104, 106; 348/117, 139, 144

[56] References Cited

U.S. PATENT DOCUMENTS

| | | | |
|---|---|---|---|
| 4,081,214 | 3/1978 | Van Buskirk | 365/3.03 |
| 4,689,748 | 8/1987 | Hofmann | 701/223 |
| 4,825,393 | 4/1989 | Nishiya | 702/152 |
| 5,023,712 | 6/1991 | Kajiwara | 348/139 |
| 5,410,346 | 4/1995 | Saneyoshi et al. | 348/116 |
| 5,716,032 | 2/1998 | McIngvale | 244/185 |
| 5,915,033 | 6/1999 | Tanigawa et al. | 382/106 |
| 5,922,031 | 7/1999 | Larrieu | 701/3 |
| 5,991,437 | 11/1999 | Migdal et al. | 382/154 |

FOREIGN PATENT DOCUMENTS 62-88914   4/1987   Japan .

*Primary Examiner*—William A. Cuchlinski, Jr.
*Assistant Examiner*—Eric M Gibson
*Attorney, Agent, or Firm*—Martin A. Farber

[57] ABSTRACT

A three-dimensional image of a ground surface taken by a stereoscopic camera is converted to a distance image in a stereoscopic processing section. In an altitude calculating section, after peculiar points contained in the distance image are deleted and further the lens distortion is deleted from the distance image, the distance image is transferred to a real space coordinate. Then, an equation approximating to a plane is obtained from data of the distance image and a length of a perpendicular line to the plane is calculated as a ground altitude.

5 Claims, 2 Drawing Sheets

ALTITUDE DETECTION BY USE OF PLANAR APPROXIMATION OF A REGION OF GROUND SURFACE

BACKGROUND OF THE INVENTION

1. Field of the Invention

The present invention relates to an altitude detecting apparatus for a flying object and more particularly to an altitude detecting apparatus for a flying object flying at a relatively low altitude.

2. Prior Arts

When a flying object flies at a low altitude, or when it makes a take off or a landing, an altimeter is an essential apparatus. In recent years, such a technique as spraying agricultural chemical by means of an unmanned helicopter has come into a stage of practical use. In this case, there are two ways in controlling the unmanned helicopter. One is a remote control in which an operator employs a radio-control of the helicopter by visual observation and the other is an autonomous control in which the helicopter flies or makes a landing and the like autonomously without the help of an operator. In the former case, it needs a high skill to continue to monitor an altitude of the helicopter by eye observation or to make a landing safely from a remote place. Further, since the primary object of using the unmanned helicopter is to save labor, it is desirable that the unmanned helicopter is autonomously controlled without the help of a skilled operator. Therefore, for this type of unmanned helicopter, an altimeter offering high precision altitude data is indispensable.

There are many kinds of altimeters such as an altimeter in which an altitude is obtained by transforming the difference of atmospheric pressure into altitude, an altimeter in which an altitude is calculated from a reflecting time when laser beam, radio wave, supersonic wave and like is transmitted to the ground surface, an altimeter in which an altitude is found based on positional information transmitted from positioning satellites such as D-GPS, an altimeter in which an altitude is obtained from acceleration and other kinds. Taking a measuring accuracy of ground altitude, a reflecting characteristic of object on ground, an environment under which the altimeter is used and the like into consideration, these altimeters have merits and demerits respectively. Few altimeters satisfy conditions suitable to an altimeter for a flying object flying at low altitude.

In order to satisfy such conditions, it is particularly important that the altimeter is free from the reflecting characteristic of an object on ground. With these in mind, a technique in which an altitude is measured by processing images taken by cameras from the flying object, is most promising. As an example of a technique of detecting altitude by images, there is a prior art disclosed in Japanese Patent Application No. Toku-Kai-Shou 62-88914. In this prior art, an altitude is obtained based on the comparison of the movement of an object in an image area with an actual distance to that area.

However, according to this prior art of measuring altitude based on image, since the actual distance to the area must be known, a map including the imaged area is needed and also a specified mark must be imaged in the area. Further, an angle of depression with respect to the center of field of view must be known and this angle of depression is measured indirectly by a gyro compass and the like, thereby the measuring accuracy is exacerbated.

SUMMARY OF THE INVENTION

In view of the defects of the prior arts, it is an object of the present invention to provide an altitude detecting apparatus capable of accurately detecting an altitude of a flying object without relying upon information to know an actual moving distance or information difficult to measure, such as an angle of depression.

To achieve the object, the present invention comprises a pair of stereoscopic cameras mounted on said flying object for taking a stereoscopic image of a ground surface under the flying object, a stereoscopic processing section for processing a pair of images imaged by the cameras and for calculating a distance data of the ground surface, and an altitude calculating section for creating a configuration of the ground surface based on the distance data of a plurality of measuring points on the ground surface so as to calculate an altitude of the flying object to the ground surface.

DETAILED DESCRIPTION OF PREFERRED EMBODIMENTS

Reference will hereinafter be made to the accompanying drawings in order to facilitate understanding of the present invention.

Figure 1:
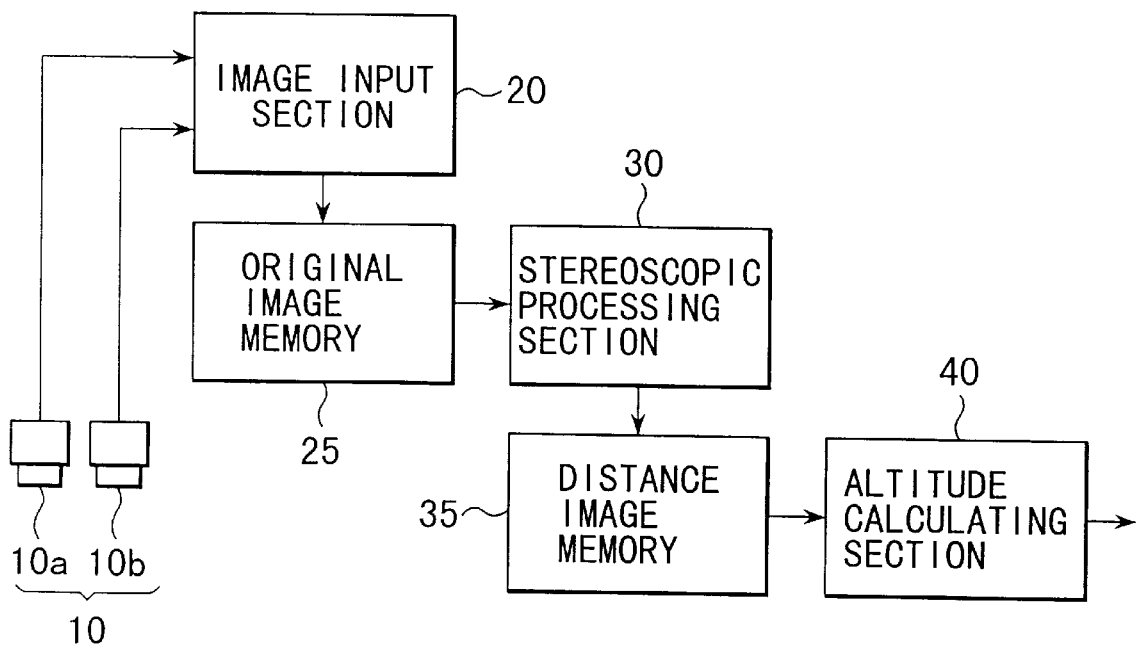
FIG. 1 is a schematic block diagram of an altitude detecting apparatus according to the present invention.

FIG. 1 shows a construction of an altitude detecting apparatus mounted on a flying object such as a helicopter which flies at a relatively low altitude. The apparatus comprises a pair of stereoscopic cameras 10 for taking three-dimensional image of a scenery below the flying object, an image input section 20 for making an input process of the image taken by the cameras 10, an original image memory 25 for storing an image processed in the image input section 20 as an original image, a stereoscopic processing section 30 for producing distance distribution information (distance image) from the original image by a stereo-matching, a distance image memory 35 for storing the distance image, and an altitude calculating section 40 for calculating a ground altitude from distance information of a plurality of detecting points. The foregoing parts, hereinafter, will be explained in more detail.

The stereoscopic cameras 10 are two CCD cameras 10a, 10b which operate synchronously with each other and whose shutter speeds are variably controlled. One CCD camera 10a is used as a primary camera for imaging a reference image and the other CCD camera 10b is used as a subsidiary camera for imaging a comparison image. Further, these two cameras are disposed with a specified base length and their optical axes are arranged in parallel with each other.

The image input section 20 comprises an analogue interface having a gain control amplifier, an A/D converter for converting analogue data from the CCD cameras 10a, 10b into digital image data and a high integrated FPGA (Flexible Programmable Gate Array) having miscellaneous image processing functions such as a LOG conversion table to make a logarithmic conversion with respect to bright and shadow portions of image. That is to say, in the image input section 20, after inputting image signals from the CCD cameras 10a, 10b in order by a gain adjustment, image corrections such as improving contrasts of low brightness portions by the LOG conversion are performed and then thus corrected image signals are converted into digital image data having a given brightness. After that, those image signals are sent to the original image memory 25 for storing.

The stereoscopic processing section 30 is constituted of a high integrated FPGA containing a city-block distance calculating circuit, a deviation detecting circuit and the like. With respect to two images stored in the original image memory 25, the reference image and the comparison image, the stereo matching is performed for each small region of respective two images to obtain three-dimensional image information (distance images) expressed in numbers.

That is, in the city-block distance calculating circuit, a city-block distance between a small region of the reference image and a corresponding small region of the comparison image is calculated and then in the deviation detecting circuit, it is checked whether or not these two small regions agree by evaluating minimum and maximum values of the calculated city-block distance. If this checking condition is satisfied and the city-block distance becomes minimum, the deviation amount of picture element at this moment is a distance information of the subject small region of the reference image. Thus obtained distance information is stored in the distance image memory 35. Detailed processes of the stereo matching are described in Japanese Patent Application Laid-open No. Toku-Kai-Hei 5-114099 filed by the applicant of the present invention.

The altitude calculating section 40 is constituted of an RISC processor and the like. The RISC (Reduced Instrumentation Set Computer) processor performs a recognition process at high speeds based on the distance distribution information obtained from the distance image. That is, in the altitude calculating section 40, assuming a plane or a curved surface from distance information of many points on the ground, the length of a perpendicular line from the flying object to the plane or the curved surface is defined to be a ground altitude. In this embodiment, the ground surface is detected as a plane from the distance information of multiple points on the ground and the length of a perpendicular line from the flying object down to that plane is obtained as a ground altitude. In order to speed up the calculation, the processes are substantially simplified.

Further, since the distances to multiple points in the image are measured and these distance information is used for calculation, not only a plane but also an up-and-down surface, a stairs-like terrain or the like, can be recognized over the wide range with good accuracy.

Next, a process of calculating an altitude in the altitude calculating section 40 will be described with reference to flowcharts shown in FIGS. 2 and 3.

Generally, in case where the ground surface is detected as a plane from the distance information of multiple points, if distance information not constituting the plane is contained therein, this information has a large effect on the detection of altitude. In case where noises or projection-like objects are detected, these noises or objects are expressed as peculiar points having apparently different values from other coherent points. Therefore, according to the process of deleting peculiar points in this embodiment, first these peculiar points are deleted from the distance image and further when the coordinate system is transformed from the image space to the actual space, the distance data belonging to different series of distance data are deleted. Using the distance data from which the peculiar points are deleted, a plane is created from the distance data of multiple points in the real space coordinate system.

Figure 2:
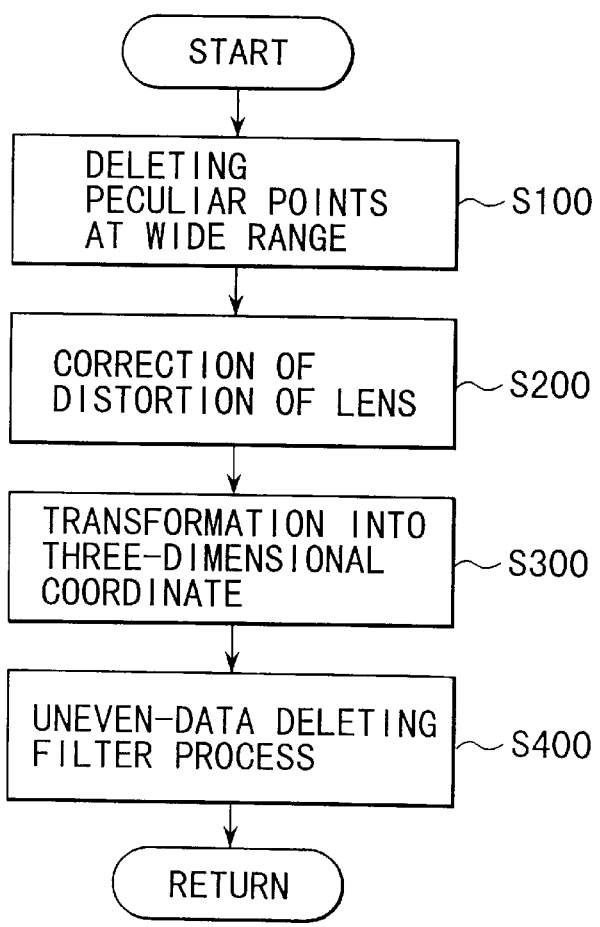
FIG. 2 is a flowchart showing a flow of control of a process for deleting peculiar points.

Specifically, in the flowchart shown in FIG. 2, at a step S100 the distance image is read and peculiar points whose values are largely apart from the value of maximum frequency are deleted from the overall distance image. The process at this step S100 is a preprocess for securing an uneven-data deleting filter process which will be described hereinafter at a step S400. In case of the distance image having a picture size composed of 400 (laterally) ×200 (longitudinally) picture elements, for example this distance image is divided into small regions or blocks having a distance data (deviation amount of picture element), each of which is composed of 8 (laterally)×4 (longitudinally) picture elements. Furthermore, this distance image is divided into 25 medium regions each of which is composed of 80 (laterally)×40 (longitudinally) picture elements. Respective medium regions include 100 (10×10) small regions and a histogram of deviation amount is prepared for these respective medium regions. When compared with the distance data having a maximum frequency in this histogram, if the distance data exceed a specified range (±1 of the distance data of the maximum frequency), the deviation amount of the block is let null to delete this peculiar point.

Then, the program goes to a step S200 where a plurality of sampled regions are selected in the distance image and the position of the sampled regions on the image surface is corrected to the position having no distortion of a lens. For example, 357 blocks of small region composed of 8 (laterally)×4 (longitudinally) are selected from the image, that is, laterally 21 blocks for every 16 picture elements and longitudinally 17 blocks for every 8 picture elements. A distance R between the position of the distance image and a point of intersection of the optical axis and the image surface is corrected according to a correction value D expressed in the following formula (1).

$$D = A \cdot R^5 + B \cdot R^3 + C \cdot R \tag{1}$$

where A, B and C are correction coefficients determined by lens manufactures or by experiments.

Figure 4A:
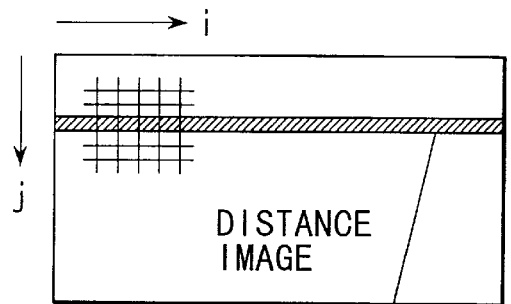
FIG. 4a is an explanatory view showing a distance image on a coordinate having a horizontal axis i and a vertical axis j.

Then, at a step S300 a three-dimensional coordinate of respective sampled small regions in the real space is obtained from the corrected position and the distance data of each sampled region on the CCD surface. Further, at a step S400 an uneven-plane deleting filter process for deleting picture elements not constituting the plane from the distance image is performed. In this process, as shown in FIGS. 4a and 4b, taking a note of a line on the image coordinate (i axis laterally, j axis vertically), a series of data is obtained on the real space coordinate (X axis laterally, Z axis longitudinally).

Figure 4B:
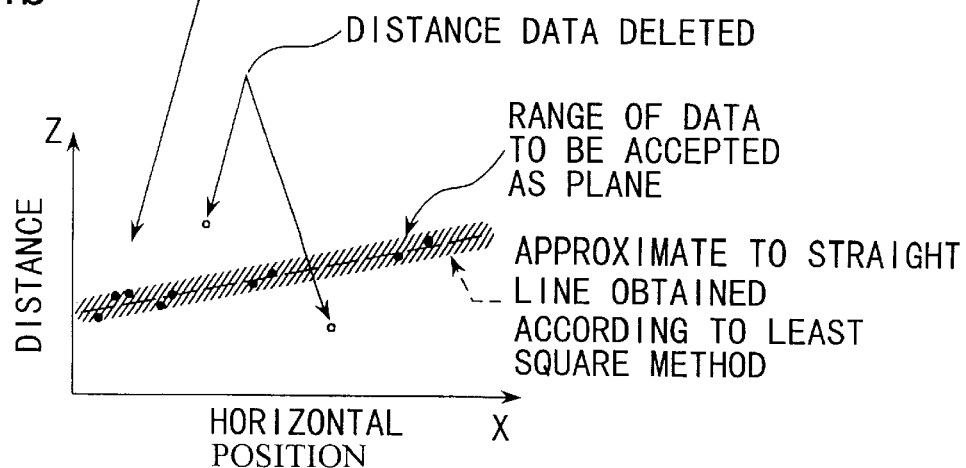
FIG. 4b is an explanatory view showing a series of distance data expressed on a real space coordinate having a horizontal axis X showing a horizontal position and a longitudinal axis Z showing a distance.

Then, this series of data is approximated to a linear equation according to the least square method, as shown in FIG. 4b. At this time, only data within a specified range (shown by slashes) are used for obtaining a plane and data out of the specified range are deleted. This process is repeated by scanning from top to bottom to delete the distance information not constituting a plane as peculiar points from the distance image.

Figure 3:
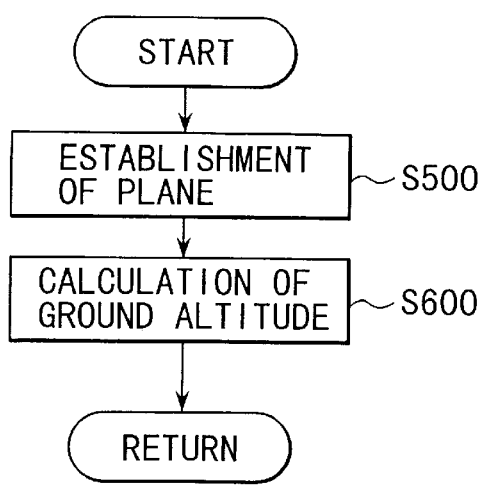
FIG. 3 is a flowchart showing a flow of control of a process for calculating an altitude.

Then, after deleting the irrespective distance information, an altitude calculating process is performed as shown in a flowchart of FIG. 3. First, at a step S500 an equation of plane as shown in the following equation (2) is established based on groups of data of coordinates (X, Y, Z) transformed from the image space into the real space by use of the least square method.

$$ax+by+cz=1 \qquad (2)$$

Next, solving the matric equations, respective coefficients a, b and c are obtained.

Then, the program goes to a step S600 where the length h of the perpendicular line from the camera to the plane is obtained according to the following formula (3). This length h is a ground altitude.

$$h=1/(a^2+b^2+c^2)^{1/2} \qquad (3).$$

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An altitude detecting apparatus for detecting an altitude of a flying object, comprising:

a pair of stereoscopic cameras mounted on said flying object for taking a stereoscopic image of a ground surface under said flying object;

a stereoscopic processing section for processing a pair of images by said cameras and for calculating a distance data of said ground surface; and an altitude calculating section for creating a configuration of said ground surface based on said distance data of a plurality of measuring points on said ground surface so as to calculate an altitude of said flying object to said ground surface;

wherein said stereoscopic processing section obtains distance data over a succession of regions of the ground surface, each of said regions being characterized by lateral and longitudinal coordinates identifying points of the data associated with movement of the flying object; and said altitude calculating section is operative to characterize the data of distance between the flying object and the ground surface by a best-fit plane for each of said regions, the altitude being calculated along a line from the object to the plane for each of the succession of said regions of the around surface.

2. The apparatus according to claim 1, further comprising:

a correcting means for correcting a distortion of lenses of said cameras so as to make said distance data more accurate, said correcting means being operative to adjust locations of points of the data on said plane by a mathematical formulation employing a set of correction coefficients.

3. The apparatus according to claim 1, wherein said altitude calculating section calculates a length of said line as a perpendicular line to said plane in a respective one of said regions as an altitude of said flying object to said ground surface.

4. The apparatus according to claim 3, further comprising:

a distance data deleting means for approximating a series of said distance data to a straight line, and for deleting a portion of said distance data falling outside of a specified range established around said straight line and being regarded as not constituting a part of said plane.

5. A method, employing an altitude detecting apparatus, for detecting an altitude of a flying object, comprising steps of:

mounting a pair of stereoscopic cameras on said flying object for taking a stereoscopic image of a ground surface under said flying object;

processing, by means of a stereoscopic processing section, a pair of images produced by said cameras, and calculating distance data of said ground surface from said flying object;

creating, by means of an altitude calculating section, a configuration of said ground surface based on said distance data of a plurality of measuring points on said ground surface;

calculating, by use of said measuring points, an altitude of said flying object relative to said ground surface;

wherein said processing step includes obtaining distance data over a succession of regions of the ground surface, each of said regions being characterized by lateral and longitudinal coordinates identifying points of the data associated with movement of the flying object; and said calculating step includes characterizing the data of distance between the flying object and the ground surface by a best-fit plane for each of said regions, the altitude being calculated along a line from the object to the plane for each of the succession of said regions of the ground surface.

* * * * *